(12) United States Patent
King et al.

(10) Patent No.: US 6,588,671 B2
(45) Date of Patent: Jul. 8, 2003

(54) POSITIONING OF A RECORDING HEAD FOR A DATA STORAGE DEVICE

(75) Inventors: Francis K. King, San Jose, CA (US); Jeffrey Liu, San Jose, CA (US); Shand-Ling Mao, Hacienda Heights, CA (US)

(73) Assignee: Dcard, Inc., Milpitas, CA (US)

( * ) Notice: Subject to any disclaimer, the term of this patent is extended or adjusted under 35 U.S.C. 154(b) by 48 days.

(21) Appl. No.: 09/922,572

(22) Filed: Aug. 3, 2001

(65) Prior Publication Data
US 2002/0005432 A1 Jan. 17, 2002

Related U.S. Application Data

(63) Continuation-in-part of application No. 09/289,280, filed on Apr. 9, 1999, now Pat. No. 6,311,893.
(60) Provisional application No. 60/081,257, filed on Apr. 9, 1998.

(51) Int. Cl.[7] .................................................. G06K 7/00
(52) U.S. Cl. ........................ 235/486; 235/475; 235/485
(58) Field of Search ................................ 235/486, 485, 235/483, 475, 449, 453

(56) References Cited

U.S. PATENT DOCUMENTS

| | | | | |
|---|---|---|---|---|
| 4,839,509 A | * | 6/1989 | Yasuma et al. | 235/482 |
| 5,912,446 A | * | 6/1999 | Wong et al. | 235/449 |
| 5,984,184 A | * | 11/1999 | Kojima | 235/441 |
| 6,021,948 A | * | 2/2000 | Tsai et al. | 235/486 |
| 6,126,073 A | * | 10/2000 | Rowlands | 235/449 |

* cited by examiner

*Primary Examiner*—Karl D. Frech
(74) *Attorney, Agent, or Firm*—Bo-In Lin

(57) ABSTRACT

This invention is a data storage system for accessing data stored in a data storage medium. The data storage system includes a motor-head assembly controlled to activate a vertical movement for loading and unloading at least a pickup head supported thereon to access the data medium in the data storage medium. For a specific data-storage system configuration, the motor-head assembly further includes a rotating motor for rotating the pickup head when the pickup head is loaded onto the data storage medium. In another system configuration, the data storage system implemented with a motor to move the data storage medium in at least one linear direction or for rotating the data storage medium. The motor-head assembly further includes a vertical-position locking hook for automatically pulling away the pickup head from the data storage media when the motor-head assembly is unloaded from the data storage medium. The vertical-position locking linkage further automatically unlock the pickup head in an unconstrained compliance state next to the data storage medium when the motor-head assembly is loaded to the data storage medium.

28 Claims, 15 Drawing Sheets

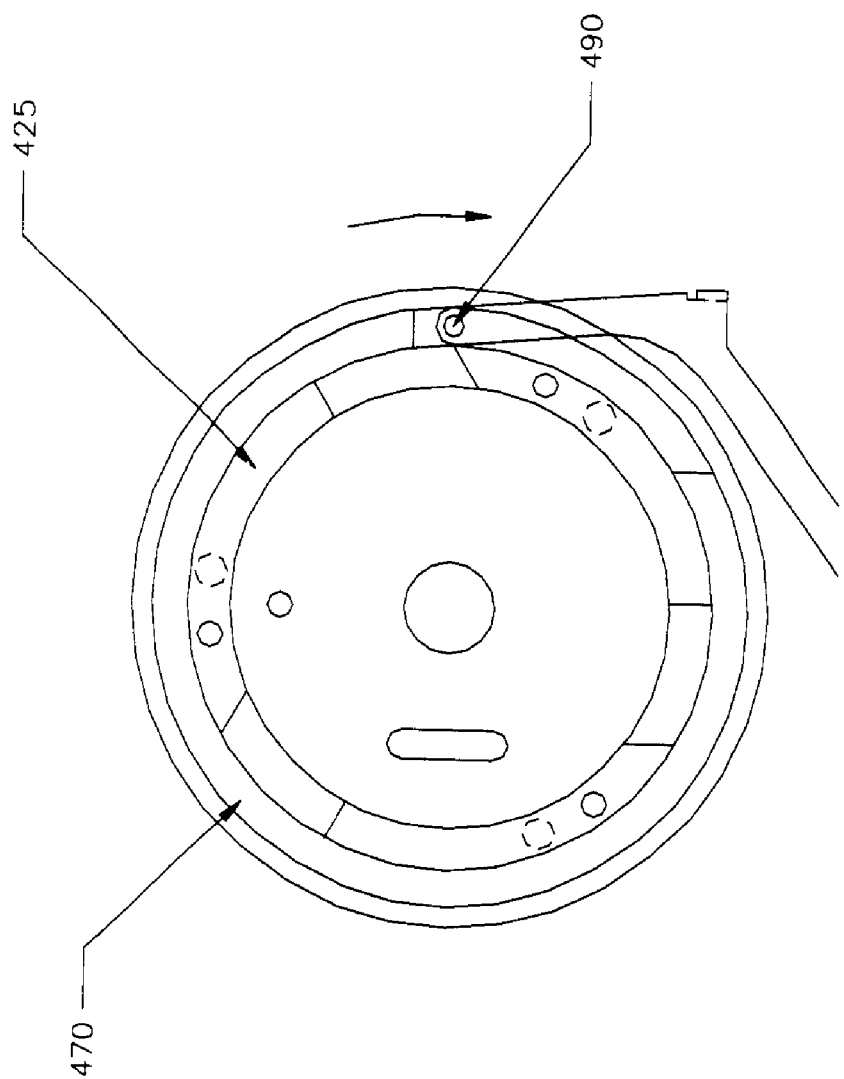

POSITIONING OF A RECORDING HEAD FOR A DATA STORAGE DEVICE

This Application is a Continuation-in-Part application (CIP) of a previously filed Provisional Application 60/081, 257 filed on Apr. 9, 1998 and a Formal application Ser. No. 09/289,280 now U.S. Pat. No. 6,311,893, with an attorney docket number DCARD-9906 filed on Apr. 9, 1999, by one of a common inventors of this patent application.

BACKGROUND OF THE INVENTION

1. Field of the Invention

This invention relates generally to systems and method for reading data from and writing data to data storage medium by employing the magnetic or optical recording technology. More particularly, this invention is related to the positioning of a head-motor assembly for a data storage device.

2. Description of the Prior Art

For a pickup head to read data from a planar data storage medium such as a data card formed with multiple data tracks, a technical difficulty is to precisely control the position of the pickup head relative to the media. Particular difficulty is caused by very narrow space between the medium and the carriage for supporting, rotating and moving the pickup head. Erroneous control of the pickup head positions due to dimensional variations, misalignment of the mechanical parts, property variations of the electrical components can cause damages to the pickup head and the storage medium.

In U.S. Pat. No. 5,535,072, entitled "Removable Cartridge Disk Drive with Cartridge Interlocking and Spindle Motor Telescoping Mechanisms" (issued on Jul. 9, 1996), Witt et al., disclose a disk drive for receiving a removable cartridge containing a disk for storing data. The disk drive includes a spindle motor for engaging and causing the disk of the cartridge to spin at an appropriate speed. The disk further includes a mechanism for mounting the spindle motor to the disk drive so that the spindle motor is movable from a first position out of the engagement with the disk to a second position to operatively engage with the disk. The spindle motor can thus move in a plane, which is not coplanar with the cartridge-receiving plane. The disk drive system further includes an ejecting mechanism to engage, lock and hold the cartridge in place in the cartridge receiver and for ejecting the cartridge from the cartridge receiver.

In another U.S. Pat. No. 6,002,547, entitled "Disk Drive with Rotatably Mounted Disk Drive Motor" (issued Dec. 14, 1999), Nicklos discloses a disk drive system that includes an head retract system, a motor loading system and an ejecting system. An operating system includes a motor, an ejecting crank, a head crank and an actuator. The motor can be selectively controlled by an actuator to power either an eject crank for ejecting the disk cartridge. Or, the motor can be selectively controlled to power the head crank to load the motor to the move the disk. The retract motion of the pickup head is parallel to the rotating cartridge recording surface.

In yet another U.S. Pat. No. 6,016,959 issued on Jun. 25, 2000, Kamo et al. disclose a rotating head system to access data on a storage medium applying a rotating head supported on a motor assembly. Kamo et al. disclose a flat medium handling mechanism to load a storage medium unto the head motor assembly.

The loading and unloading systems as disclosed by Witt et al., and by Nicklos, provide improvements for better control of the interlocking and actuation of the driving motor to rotate the disk cartridge. Additionally, the loading and unloading system of the storage medium as that disclosed by Kamo et al., provide improvements to better control the vertical position for loading the data storage medium to a fixed vertical position of the head assembly. The state of the arts as disclosed by these inventions do not provide a solution to precisely and dynamically control the positioning of the pickup head that is moving and rotating over a flat data storage medium. More specifically, the technical difficulties in positioning a pickup head for a data access system as disclosed and resolved by the previously filed Patent Applications 60/081,257, 09/289,427, cannot be resolved by applying the teachings disclosed by Witt et et al., Niclos, or Kamo et al. Particularly, for a portable system this difficulty is even more pronounced due to the tight space allowance between the medium and the carriage for supporting, rotating and moving the pickup head.

Therefore, a need still exists for a further improved data-card operated with new configuration and method to overcome the technical difficulties as described above. Specifically, the storage card drive system shall provide control mechanism to precise control the pickup position relative to the data storage medium with measure to prevent damages caused by control inaccuracies. Furthermore, it would be desirable to provide linkage for loading/loading of the pickup head with the locking and unlocking of the lateral-linear movements of the data storage medium such that safeguard of the pickup head and data storage medium is further assured.

SUMMARY OF THE PRESENT INVENTION

Therefore, an object of the present invention is to provide a data storage-card drive system with at least one pickup head rotating over the data-storage card. The data read-write functions are enabled through controlling the vertical movement of a head-motor assembly for loading the pickup head to the storage medium. The pickup head is supported on a motor-head assembly precisely controlled to move up and down for accurately positioning of the pickup head relative to access the data stored in multiple data tracks. The motor-head assembly with accurate position control to move perpendicularly to the storage medium is further provided with locking and unlocking mechanisms for preventing inadvertent movement of the pickup head against the data storage medium. With a motor-head assembly disclosed in this invention, the above mentioned difficulties and limitations encountered in a regular data card can be overcome.

Specifically, it is an object of the present invention to provide a data-storage card drive system with single or multiple pickup heads driven by a motor, e.g., a brushless motor, to rotate over the data-storage card with the rotation axis perpendicular to the card surface. The motor is mounted on a carriage functioning as a head-motor assembly. An inner motor base and outer database are implemented to provide accurate vertical position control for loading and unloading the pickup head. A locking means is implemented to prevent inadvertent movement of the pickup head against the data storage medium. Meanwhile, an X-Y table is provided to move and position the card on the center relative to the rotation of the pickup head.

Another object of this invention is to support the pickup head and a head-motor for rotating the pickup head on a motor-head assembly. The head-motor assembly is implemented with inner and outer motor bases to provide accurate position control. Vertical position guiding pins are also used to guide the vertical movement of the motor-head assembly with stops provided on each guide pin to prevent the motor-head assembly form moving over a maximum position. Linkage and locking mechanism are employed for locking and releasing the data storage medium as the head-motor assembly are controlled to load and unload from the data storage medium to prevent inadvertent movement of data storage medium that may cause damages to the data storage medium and the pickup head.

Briefly, in a preferred embodiment, the present invention discloses a data storage system for accessing data stored in a data storage medium. The data storage system includes a motor-head assembly controlled to activate a vertical movement for loading and unloading a rotating pickup head supported thereon to access the data medium in the data storage medium. The motor-head assembly further includes a rotating means for rotating the pickup head when the pickup head is loaded onto the data storage medium. The motor-head assembly further includes a vertical-position locking means for automatically pulling away the pickup head from the data storage media when the motor-head assembly is unloaded from the data storage medium. The vertical-position locking means further automatically unlock the pickup head in an unconstrained compliance state next to the data storage medium when the motor-head assembly is loaded to the data storage medium.

The present invention further discloses a data storage system for accessing data stored in a data storage medium. The data storage system includes a motor-head assembly controlled to activate a vertical movement for loading and unloading a pickup head supported thereon to access the data medium in the data storage medium. The data medium carriage assembly further includes a rotating means for rotating the data storage medium when the pickup head is loaded onto the data storage medium. The motor-head assembly further includes a vertical-position locking means for automatically pulling away the pickup head from the data storage media when the motor-head assembly is unloaded from the data storage medium. The vertical-position locking means further automatically unlock the pickup head in an unconstrained compliance state next to the data storage medium when the motor-head assembly is loaded to the data storage medium.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIGS. 6B and 6C are a top view and side cross sectional view of the inner motor base and the outer motor base engaging each other with a control lever rotates the outer motor base to control the vertical position of the inner motor base.

DETAILED DESCRIPTION OF THE PREFERRED EMBODIMENT

Figure 1A:
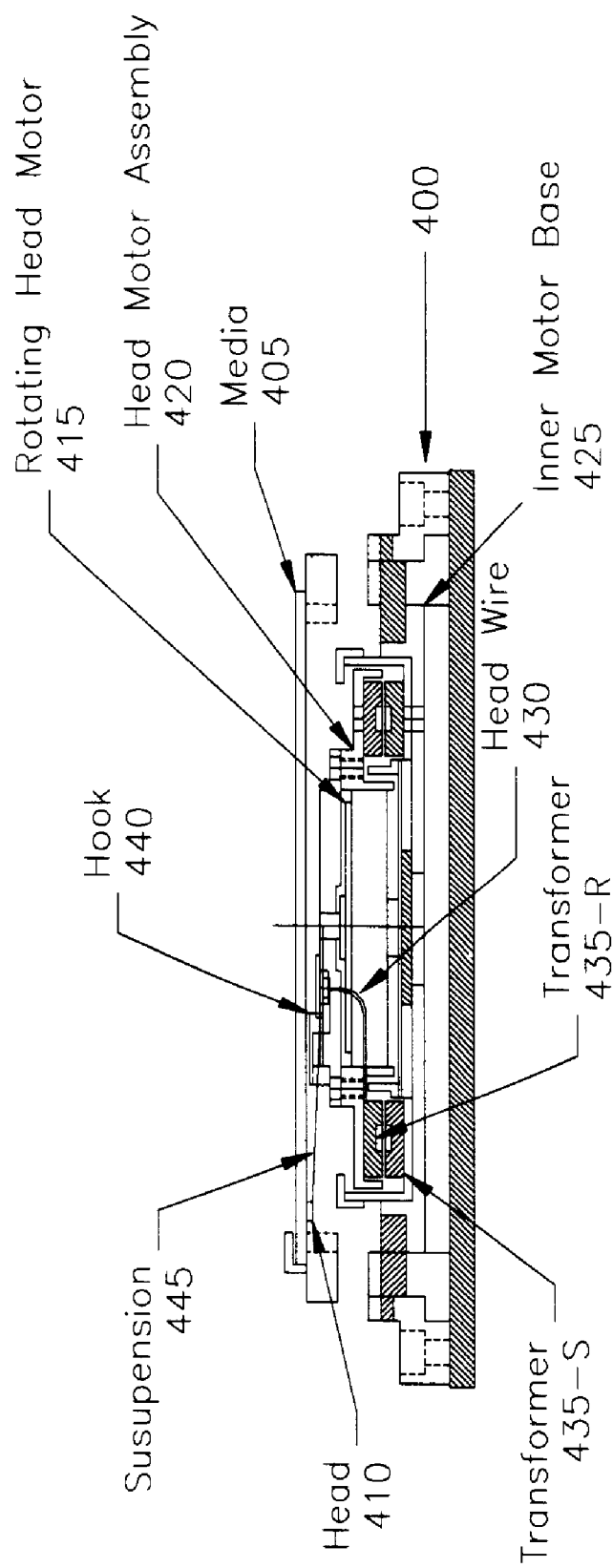
FIG. 1A is a side cross sectional view for showing the positioning of a head-motor assembly supporting a pickup head to precisely control a vertical movement in a direction perpendicular to a storage medium for either a rotating pickup head or a rotating storage medium.

Referring to FIGS. 1A for a side cross sectional view of the data storage system 400 of this invention for performing the data access operation on a data storage medium 405 by employing a pickup head 410 driven by a rotating motor 415. The pickup head 410 and the rotating motor 415 are integrated onto a head-motor assembly 420 supported on an inner motor base 425. For a non-rotating pickup head configuration, the rotting motor 415 is removed and replaced by a fixed mounting block 415. The signals for reading and writing data are transmitted through a pickup head wire 430 connected to a rotational part 435-R of a transformer that further includes non-rotational base part 435-S. For a configuration where non-rotating pickup head is implemented, the transformer 435-R and 435-S is removed.

Figure 2A:
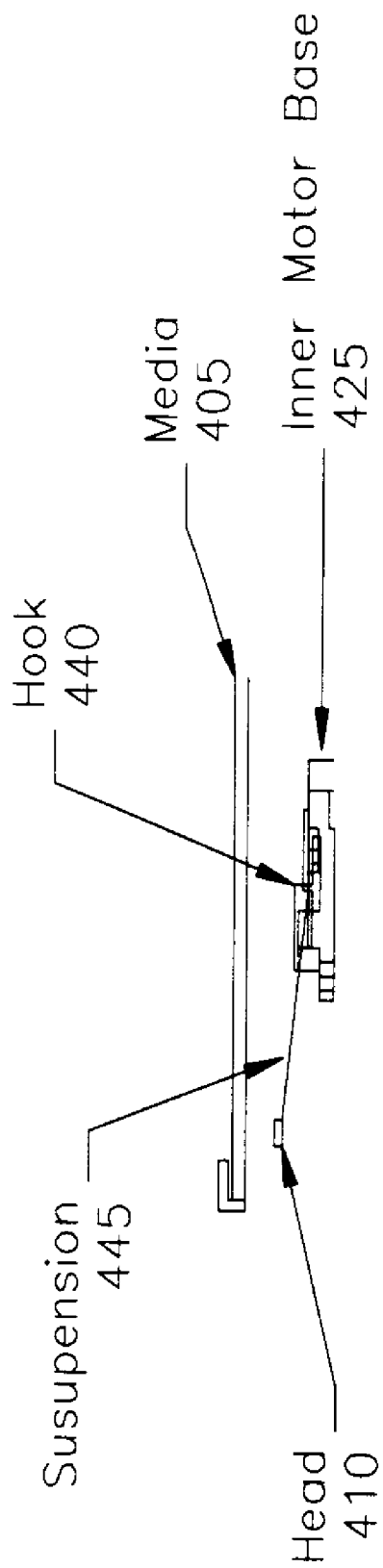
FIGS. 2A and 2B are two cross sectional view showing two different positions of the rotating pickup head as the head-motor assembly is pulled away and loaded up to the data storage media respectively.
Figure 2B:
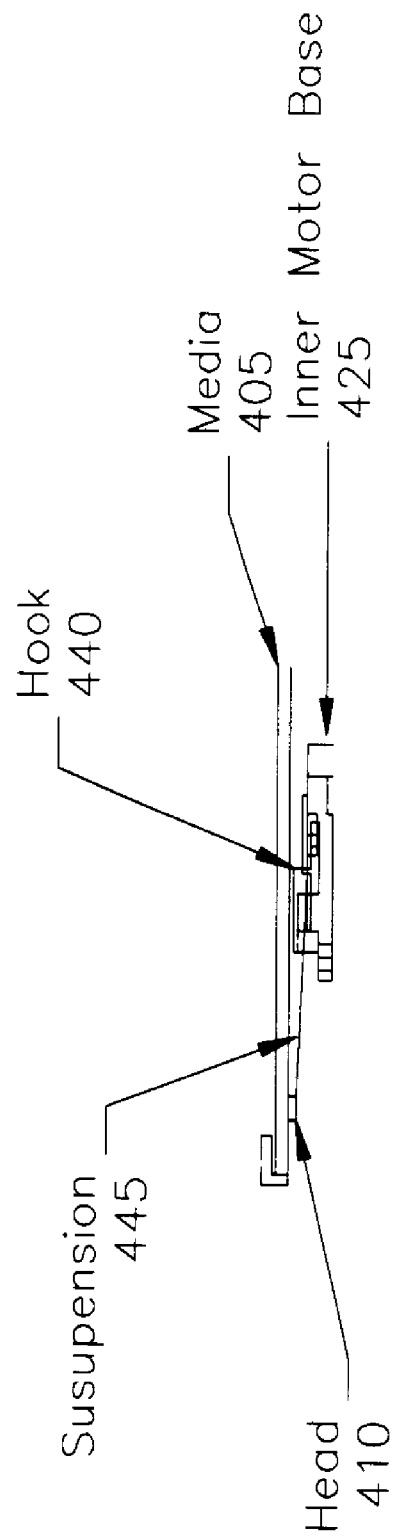

The inner motor base is controlled to move vertically up and down for loading and unloading the pickup head 410 to the data storage medium 405. The inner motor base 425 further includes a hook 440 to engage and disengage a pickup head arm 445 respectively as the inner motor base 425 is moved down and up as that shown in FIGS. 2A and 2B. AS shown in FIG. 2A, when the inner motor base 425 is moved down, the hook 440 is also moved down to engage the pickup head arm 445 and pull the pickup head 410 away and unloaded from the storage medium 405. Conversely, as that shown in FIG. 2B, when the inner motor base 425 is moved up, the hook 440 is also moved up thus release the pickup head arm 445 to allow the pickup head to approach and loaded onto the data storage medium 405.

Figure 1B:
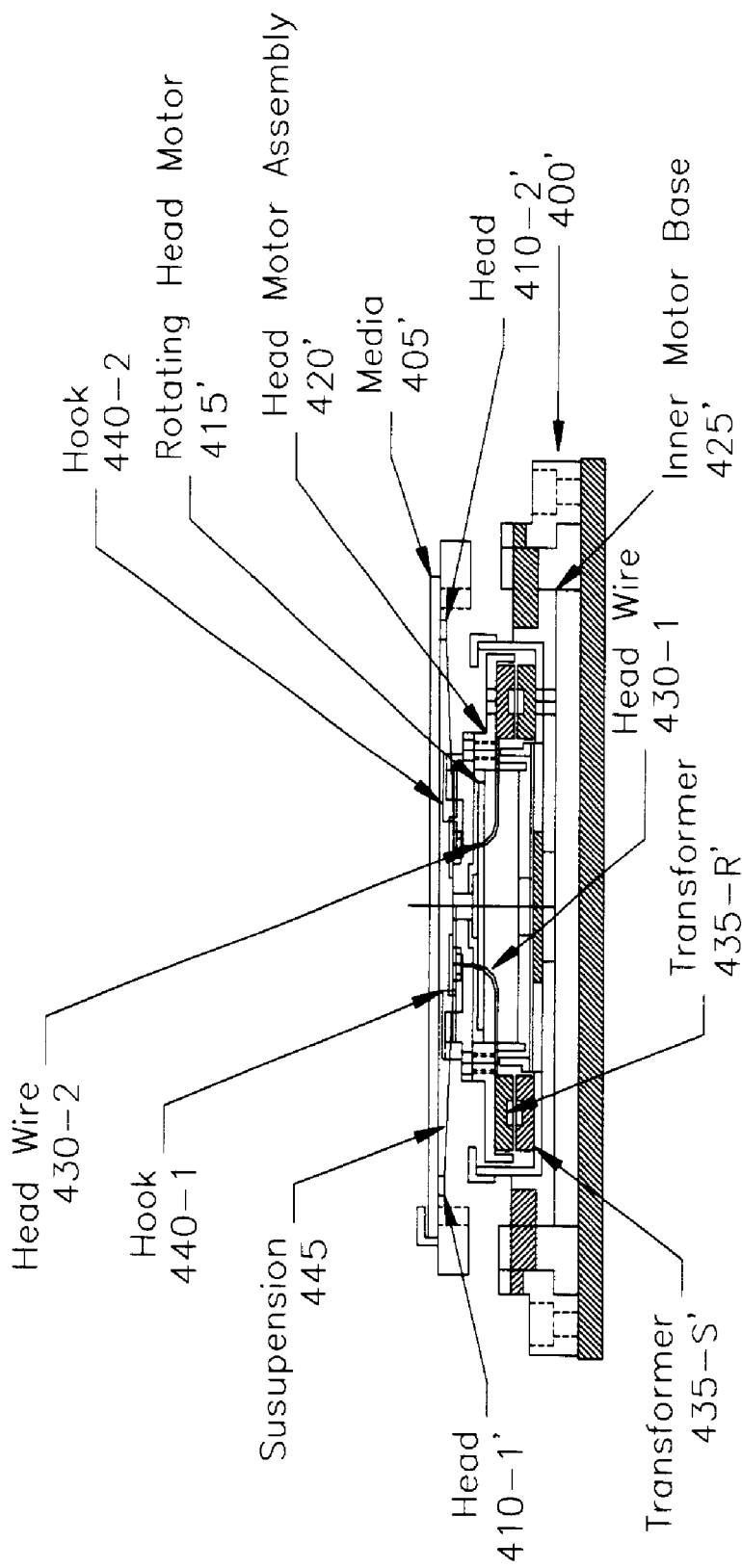
FIG. 1B is a side cross sectional view for showing the position of a head-motor assembly supporting two pickup head to precisely control a vertical movement in a direction perpendicular to a storage medium for either multiple rotating pickup heads or a rotating storage medium.

Referring to FIG. 1B for a side cross sectional view of the data storage system 400' as an alternate preferred embodiment of this invention for performing the data access operation on a data storage medium 405' by employing two pickup heads 410-1' and 410-2' driven by a rotating motor 415'. The pickup heads 410-1' and 410-2' and the rotating motor 415' are integrated onto a head-motor assembly 420' supported on an inner motor-base 425'. For a non-rotating pickup head configuration, the rotting motor 415 is removed and replaced by a fixed mounting block 415'. The signals for reading and writing data are transmitted through two pickup head wires 430-1 and 430-2 connected to a rotational part 435-R of a transformer 435' that further includes non-rotational base part 435-S'. The transformer now has two sets of coils and each set is employed for signal transformation of read-write signals for one pickup head. For a configuration where non-rotating pickup head is implemented, the transformer 435-R and 435-S is removed.

Similar to that shown in FIG. 1A, the inner motor base is controlled to move vertically up and down for loading and unloading the pickup heads 410-1' and 410-2' to the data storage medium 405'. The inner motor base 425' further includes two hooks 440-1 and 440-2 to engage and disengage a pickup head arm 445-1' and 445-2' respectively as the inner motor base 425' is moved down and up similar to that described for FIG. 1A and shown in FIGS. 2A and 2B. As the inner motor base 425' is moved down, the hook 440-1' and 440-2' are also moved down to engage the pickup head arms 445-1' and 445-2' and pull the pickup heads 410-1' and 410-2' away and unloaded from the storage medium 405. Conversely, as the inner motor base 425' is moved up, the hooks 440-1' and 440-2' are also moved up thus release the pickup head arms 445-1' and 445-2' to allow the pickup heads to approach and loaded onto the data storage medium 405'. As the second head now has another signal wire and another set of transformer coils, the second head can be employed for reading/writing data to the storage medium to reduce data access latency. An alternate embodiment of the invention is to apply the second head for reading servo data to improve the data access speed.

Figure 3A:
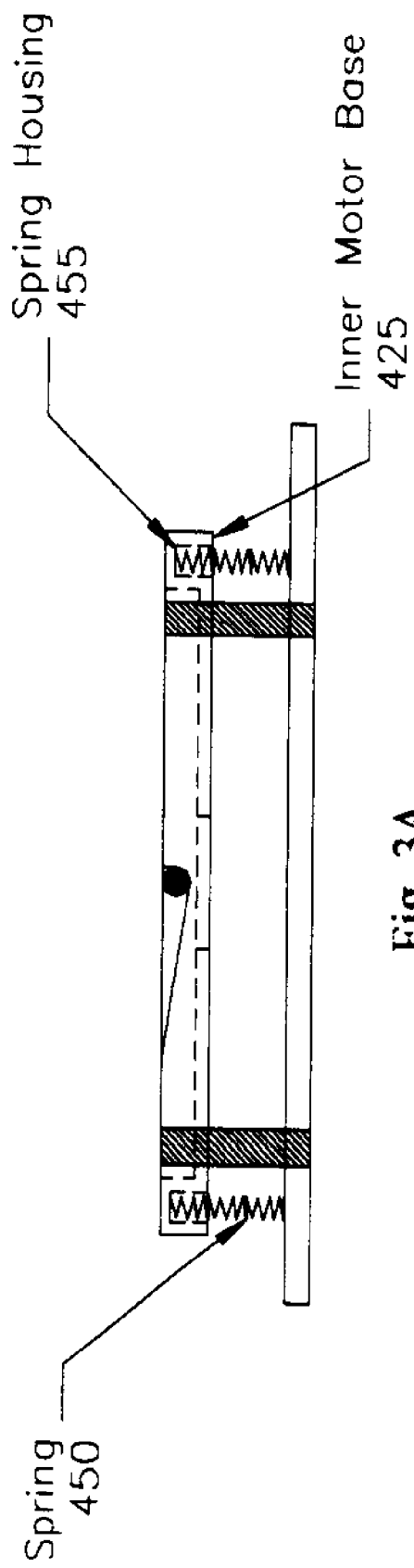
FIG. 3A is a side cross sectional view of a inner motor base with the pre-load spring ready to push the motor base away from the base-mount.
Figure 3B:
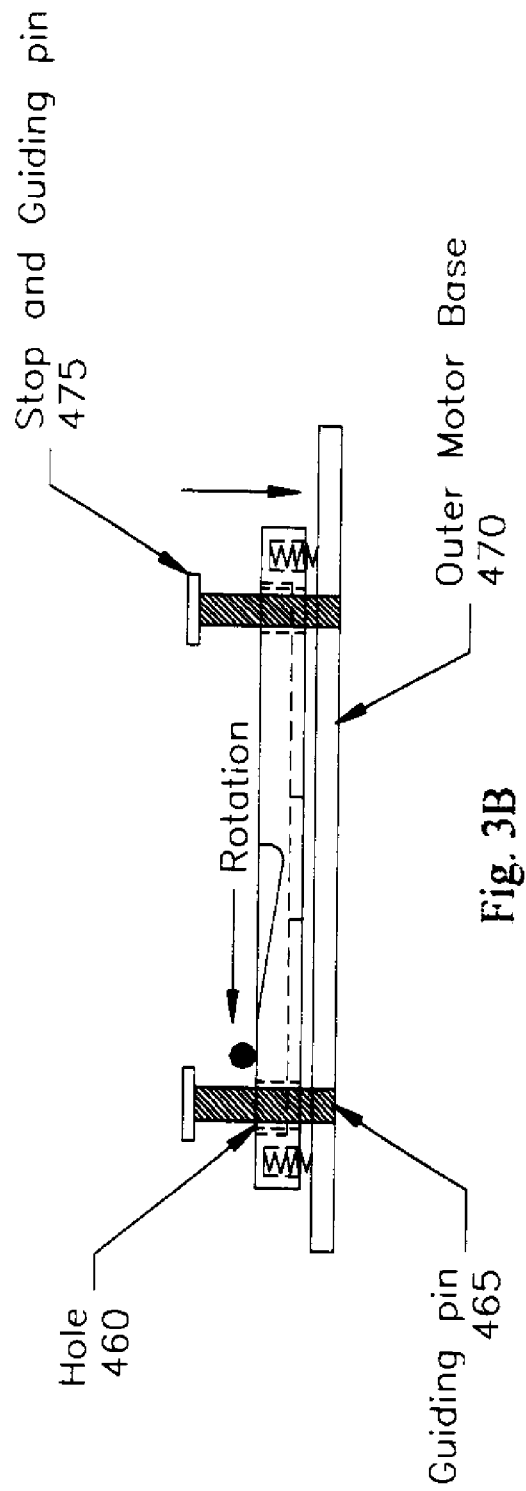
FIG. 3B is a side cross sectional view of a inner motor base with a guide pin and stop for guiding the inner motor base to a maximum pushup position.

Referring to FIGS. 3A and 3B for the vertical movement mechanisms of the inner motor base 425. The inner motor base 425 includes a set of springs 450. The springs 450 are compressed and disposed inside the spring housing 455. The inner motor base 425 further includes a set of through holes 460 for placing guiding pins 465 supported on an outer motor base 470 for guiding the vertical movements of the inner motor base along the guiding pins 465. Each of the guiding pins 465 further includes a stop 475 for limiting the maximum upward movement of the inner motor base 425 guided along the guiding pins 465.

Figure 4A:
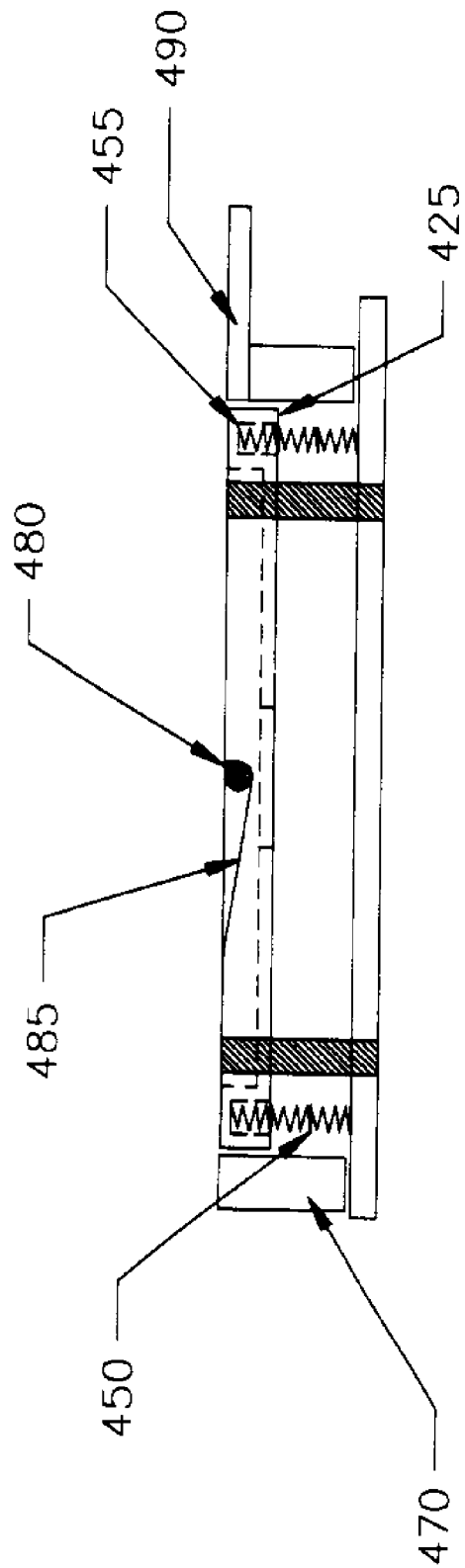
FIGS. 4A and 4B are respectively side cross sectional view and top view of the inner and outer motor bases.
Figure 4B:
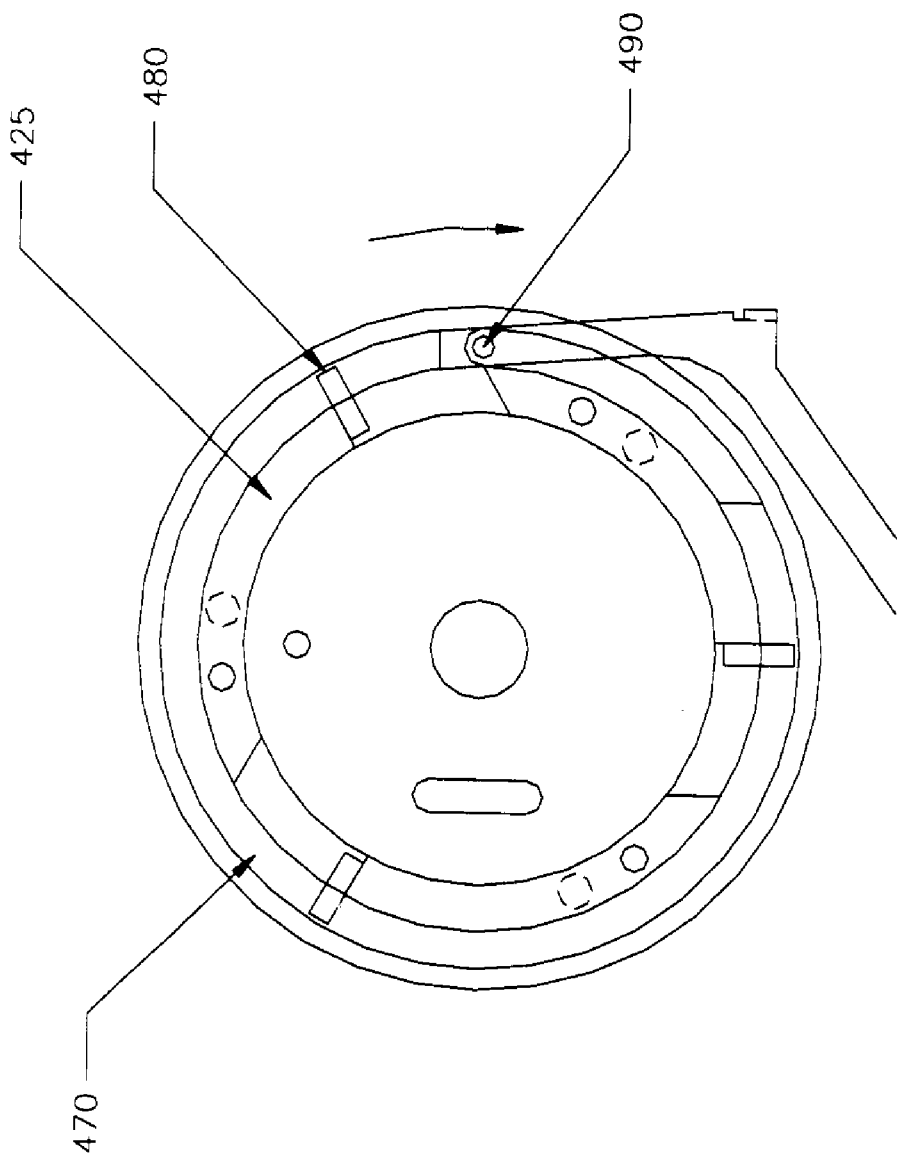
Figure 5:
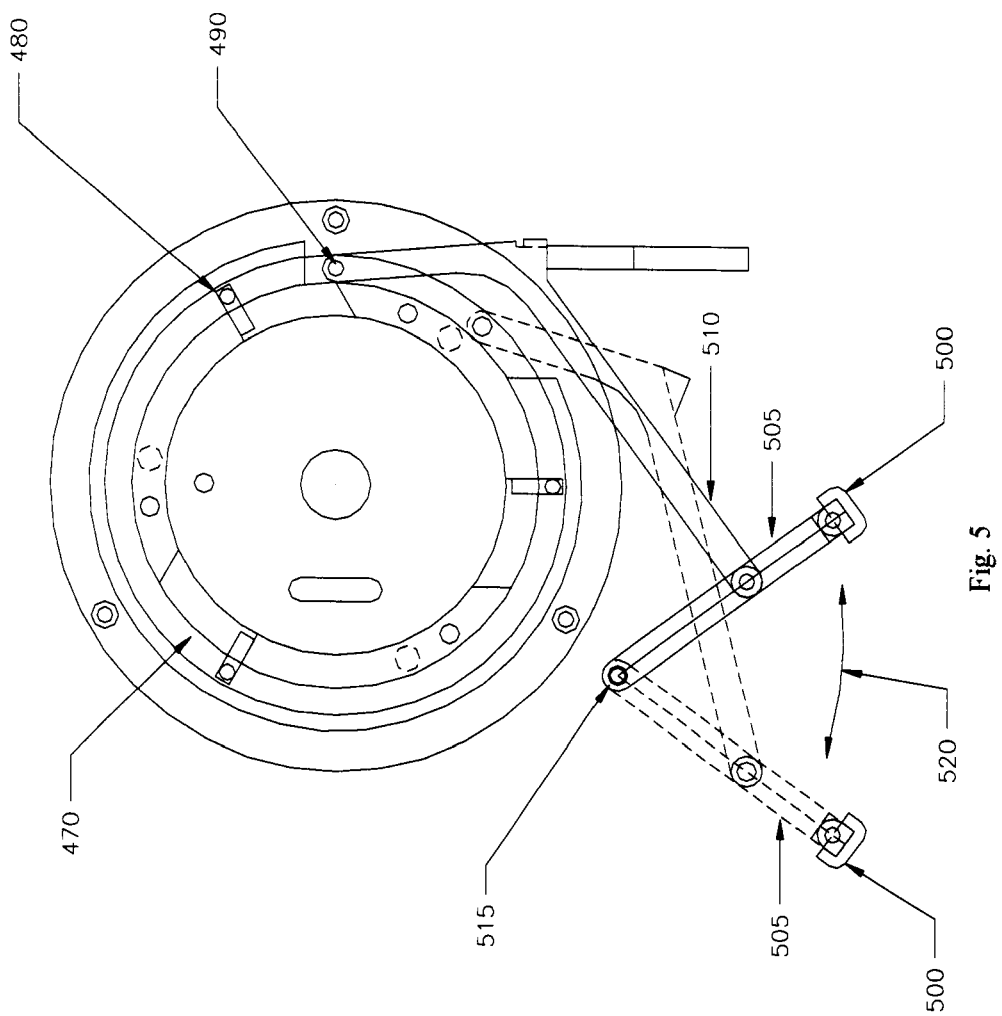
FIG. 5 is a top view of a linkage assembly for pushing a pin functioning as a cam for moving the inner motor base along a vertical direction to deploy or disengage the head-motor assembly.

Referring to FIGS. 4A and 4B for a cross sectional view and a top view of the pin-and-cam movement mechanism. The vertical movement mechanism includes a pin 480 and bottom surface of the inner motor base is formed with a reversed-V shape surface 485. A cam 490 is connected to a control linkage for rolling the pin along the bottom reversed-V-shaped surface 485. As shown in FIG. 4B, as the outer motor base 470 is rotating by moving the cam 490 that is part of the outer motor base 470, the pin is rolling along the reversed-V shaped surface. The movement of the cam 490 together with the outer motor base 470 causes the inner motor base 425 to move up and down for loading and unloading the pickup head from the data storage medium. The linkage 510 that is connected to a control lever 500 is shown in FIG. 5. As shown by the solid and dotted lines, as the control lever 500 is switched to an on and off positions respectively. Meanwhile, the cam 490 rolls the pin 480 to load and unload the pickup head 410 to the data storage medium 405 through the vertical movements of the inner motor base 425.

Figure 6A:
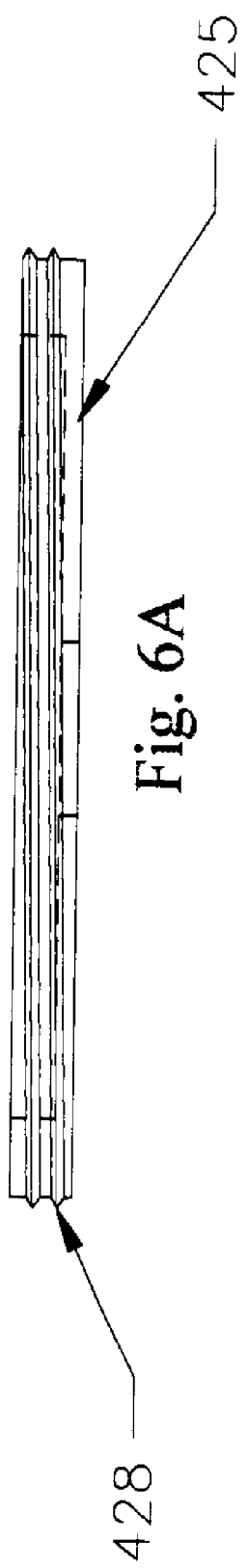
FIG. 6A is a side cross sectional view of the inner motor base with the side surface formed with threads to engage the outer motor base.
Figure 6C:
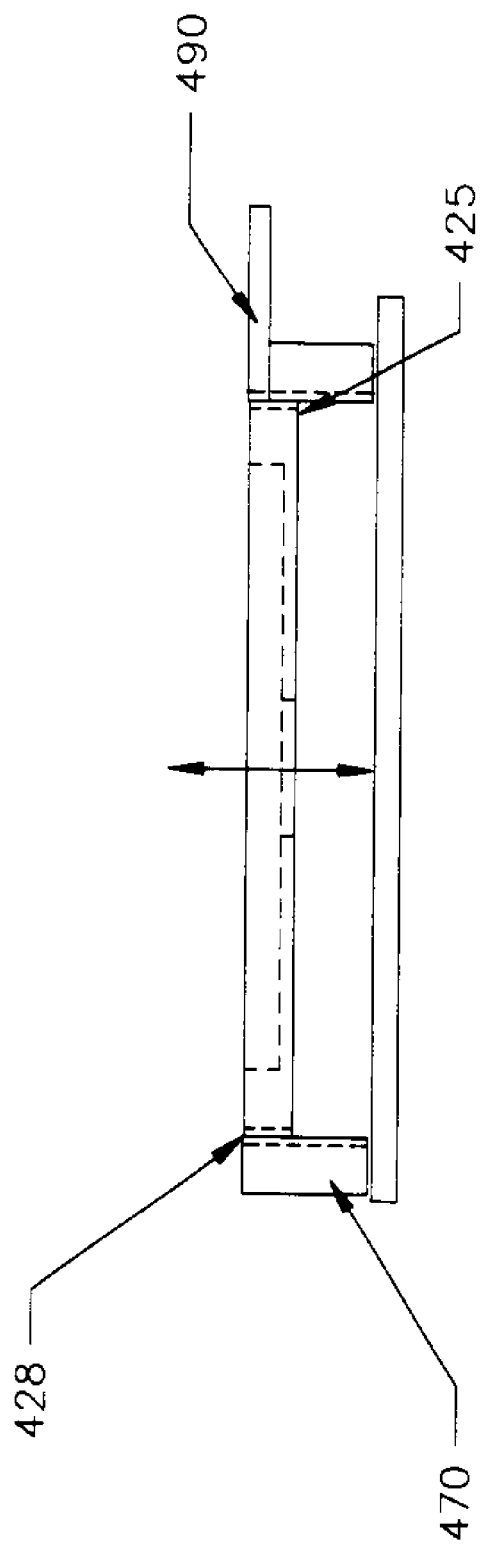

FIG. 6A is a cross sectional view of the inner motor base 425 with threads 428 formed on the edge surface. FIGS. 6B and 6C are a top view and a cross sectional view respectively of the inner motor base 425 and the outer motor base 470. As shown in FIG. 5, the control lever 500 to move two elongated arms 505 and 510 connected with a pivot 515. As shown by the double arrow curve 520, the control lever 500 is provided to move two elongated arms 505 and 515 at two different positions that in turn push the linkage arm 510 to move the cam 490. As the control lever 500 moves to rotate the outer motor base 470, the threads on the side surface of the inner motor base caused the inner motor base 425 to rotate relative to the outer motor base 470 like a screw against a nut. A vertical movement is activated that causes the inner motor base to move up and down relative to the outer motor base for loading and unloading the pickup head to and from the data storage medium.

Figure 7A:
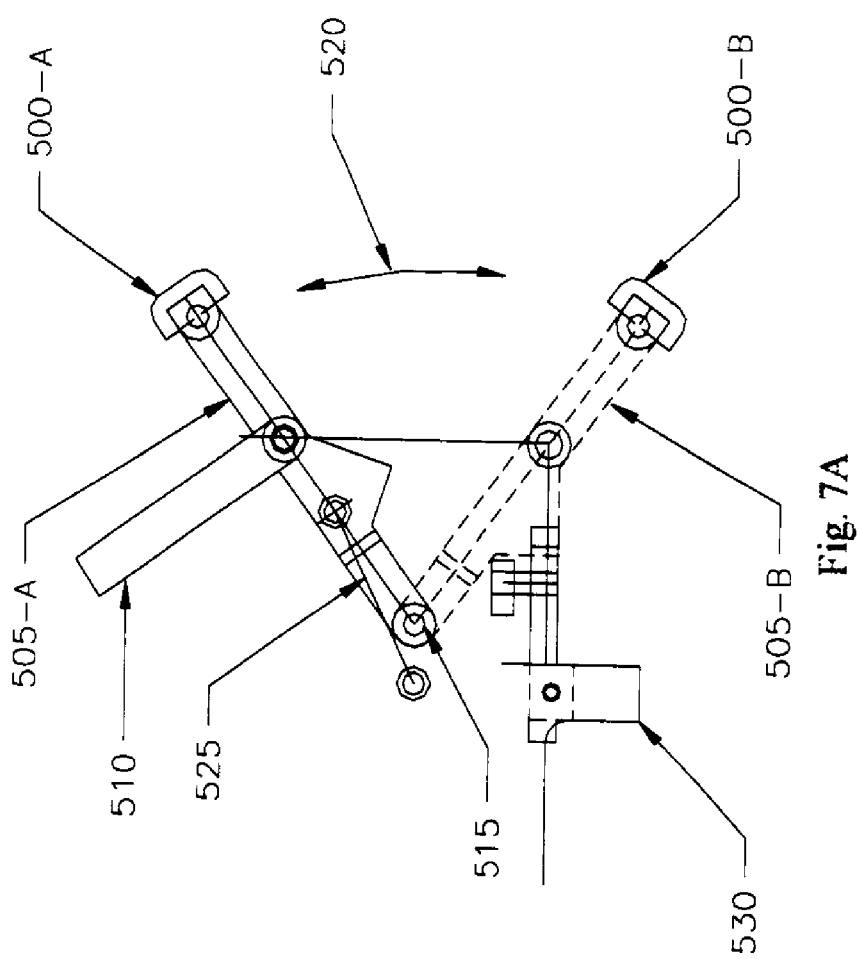
FIGS. 7A to 7C are a top view and two side cross sectional views of an interlock of linkage and motor base engaging each other to prevent the unwanted medium carriage movement relative to head motor assembly.
Figure 7B:
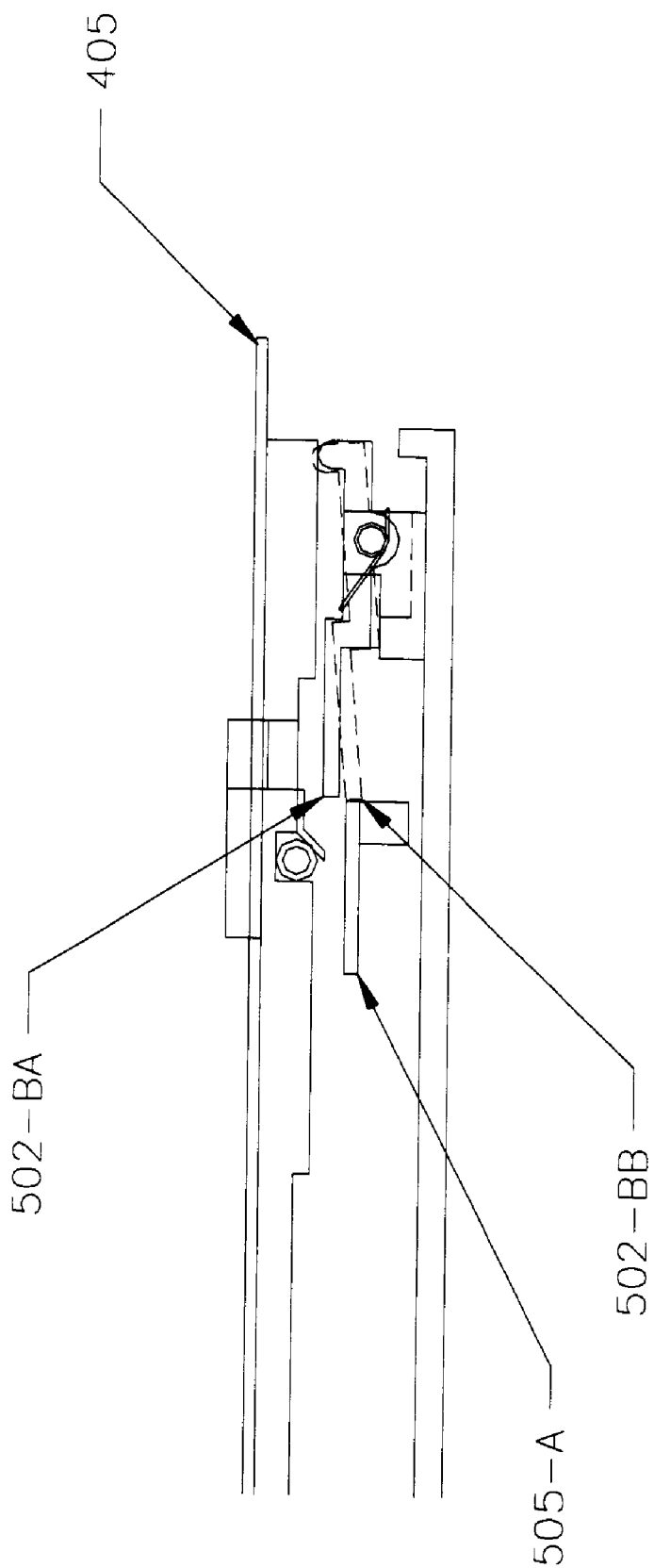
Figure 7C:
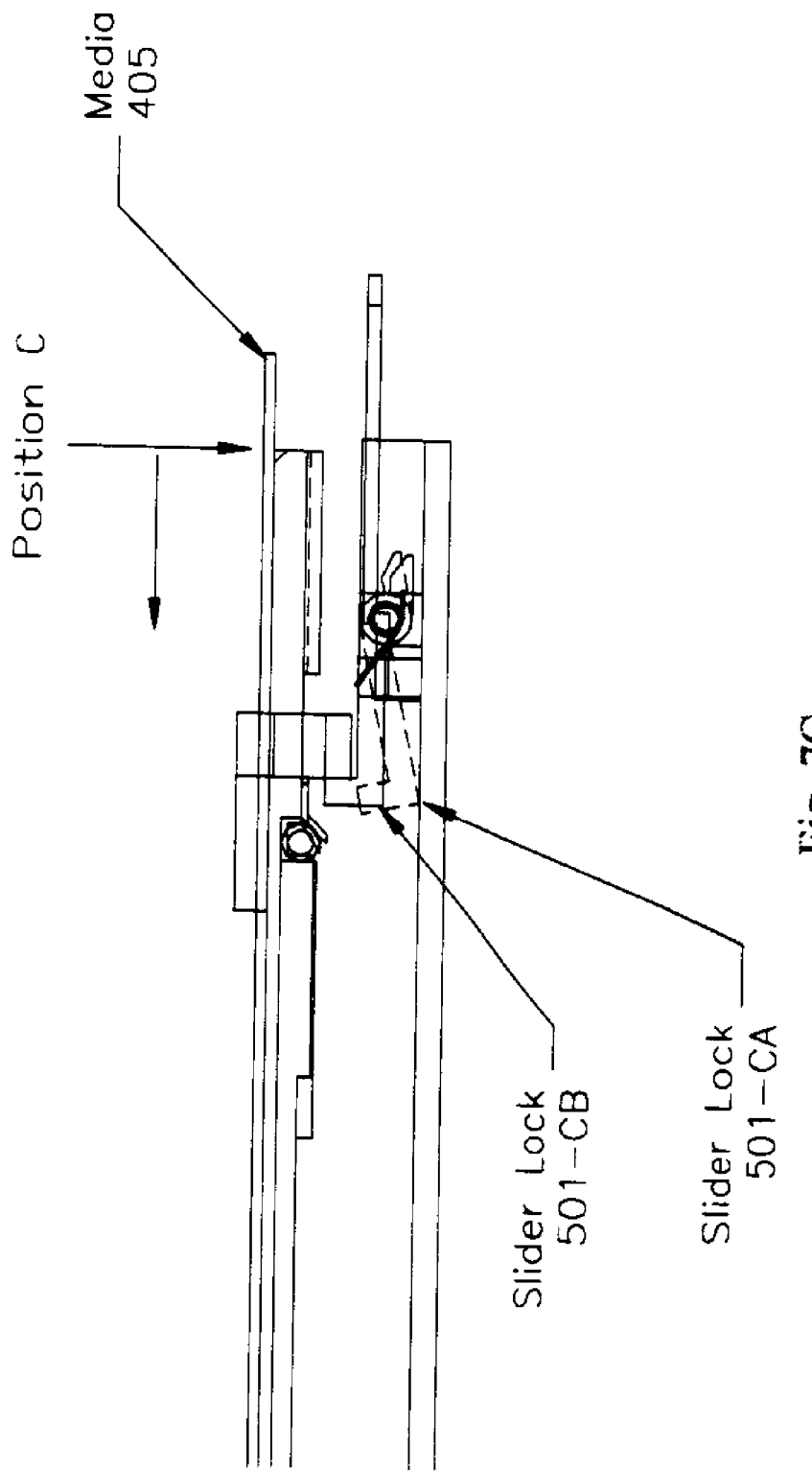

Referring to FIGS. 7A to 7C for a top view and two side cross sectional views for showing the linkage and locking mechanisms as the control lever 500 moves at two different positions, position A and position B along the double arrow curve 520. The elongated arms connected via the pivot 515 further have an extension spring 525 for keeping these two elongated arms 505 and 510 to stay either at position A or position B and for reducing a force required to move the control lever 500. As the control lever moves to position B, a slider lock is moved to a lock position to lock the slider 530, i.e., a Y-able 502, from BA to BB as showed in FIG. 7B. The slider 530 is prevented from moving for loading the card and for unloading the head. Referring to FIG. 7C, when the slider returns to position C, the linkage is moved from position CA to position CB. This movement unlocks the linkage and allows the linkage to move freely from A to B to unload pickup head for media removal. The linkage moves the inner motor base up to load the pickup head to the storage medium 405. In the meantime, the control lever is blocking the storage medium insertion-removing opening to prevent the inadvertent movement of the data storage medium. As the slider 530 moves out from position C, the linkage lock is moved from CB to CA and the linkage is locked at position A. Referring to FIG. 7B, as the control lever 500 moves to position A, the linkage and locking is moved from position BB to position BA and the slider 530 is allowed to freely move.

According to FIGS. 1 to 7, and above descriptions, this invention discloses a data storage system for accessing data stored in data storage medium 405. The data storage system includes a motor-head assembly 420 controlled to activate a vertical movement for loading and unloading a rotating pickup head 410 supported thereon to access the data medium in the data storage medium 405. The motor-head assembly 420 further comprising a rotating means 415 for rotating the pickup head 410 when the pickup head is loaded onto the data storage medium 405. The motor-head assembly further includes a vertical-position locking means 440 for automatically pulling away the pickup head 410 from the data storage media when the motor-head assembly 420 is unloaded from the data storage medium. The vertical-position locking means 440 further automatically unlocking the pickup head in an unconstrained compliance state next to the data storage medium when the motor-head assembly is loaded to the data storage medium. The motor-head assembly further includes a guide and stopping means 465 for guiding the motor-head assembly in activating the vertical movement and stopping at a predetermined position for precisely controlling a relative position of the pickup head from the data storage medium. In a preferred embodiment, the data storage system further includes a linkage and locking means 495 for locking the storage media in the data storage system and for linking and activating the vertical movement of the motor-head assembly to load the pickup head to the data storage medium. In another preferred embodiment, the linkage and locking means further comprising a lever 500 for moving the linkage and locking means 495 for locking the storage media in the data storage system and for linking and activating the vertical movement of the motor-head assembly to load the pickup head to the data storage medium. In another preferred embodiment, the linkage and locking means further comprising a unlocking mechanism for unlocking and removing the storage media from the data storage system and for linking and activating the vertical movement of the motor-head assembly to unload the pickup head from the data storage medium. In another preferred embodiment, the motor-head assembly further includes an inner motor base 425 and an outer motor base 470. One of the motor bases is kept at a fixed vertical position and another one of the motor bases is controlled to activate the vertical movement for precisely controlling the vertical movement relative to the fixed vertical position. In another preferred embodiment, the motor-head assembly further includes an inner motor base and an outer motor base. One of the motor bases is kept at a fixed vertical position and another one of the motor bases is controlled by the linkage and locking means to activate the vertical movement for precisely controlling the vertical movement relative to the fixed vertical position. In another preferred embodiment, the outer motor base 470 is kept at the fixed vertical position and the inner motor base 425 is controlled by a cam-and-pin mechanism to move vertically relative to the outer motor base. In another preferred embodiment, the outer motor base is kept at the fixed vertical position. The inner motor base 425 is engaged to the outer motor base with a plurality of threads 428 whereby a rotation of the outer motor base 470 is implemented to move the inner motor base vertically relative to the outer motor base.

The invention further discloses a method for configuring a data storage system for accessing data stored in a data storage medium. The method includes a step of controlling a motor-head assembly to activate a vertical movement for loading and unloading at least a pickup head supported thereon to access the data medium in the data storage medium. In a preferred embodiment, the step of controlling the motor-head assembly further comprising a step of employing a rotating means for rotating the pickup head when the pickup head is loaded onto the data storage medium. In a preferred embodiment, the step of controlling a motor-head assembly further comprising a step of employing a vertical-position locking means for automatically pulling away the pickup head from the data storage media when the motor-head assembly is unloaded from the data storage medium. In a preferred embodiment, the step of employing the vertical-position locking means further comprising a step of automatically unlocking the pickup head in an unconstrained compliance state next to the data storage medium when the motor-head assembly is loaded to the data storage medium. In a preferred embodiment, the step of controlling the motor-head assembly further comprising a step of employing a guide and stopping means for guiding the motor-head assembly in activating the vertical movement and stopping at a predetermined position for precisely controlling a relative position of the pickup head from the data storage medium. In a preferred embodiment, the method further includes a step of employing a linkage and locking means for locking the storage media in the data storage system and for linking and activating the vertical movement of the motor-head assembly to load the pickup head to the data storage medium.

Therefore, the present invention discloses a data storage-card drive system with a pickup head moving above the data-storage card. The data storage card includes multiple data tracks arranged as plurality of arcs, e.g., half-circle, or alternatively concentric circles depending on particular system configuration. The pickup head is driven by a motor, e.g., a brushless motor, to rotate over the data-storage card with the rotation axis perpendicular to the card surface. The motor is mounted on a carriage for making horizontal movement along a longitudinal direction of the data card. An X-Y table is provided to move and position the card on the center relative to the rotation of the pickup head. The pickup head and the head-motor for rotating the pickup head are supported on a motor-head assembly implemented with inner and outer motor bases to provide accurate position control. Vertical position guiding pins are also used to guide the vertical movement of the motor-head assembly with stops provided on each guide pin to prevent the motor-head assembly form moving over a maximum position. Linkage and locking mechanism for locking and releasing the data storage medium to prevent inadvertent movement of data storage medium that may cause damages to the data storage medium and the pickup head.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A method for configuring a data storage system for accessing data stored in a data storage medium comprising:

controlling a motor-head assembly to activate a vertical movement for loading and unloading at least a pickup head supported thereon to access said data medium in said data storage medium; and said step of controlling said motor-head assembly further comprising a step of employing an inner motor base and an outer motor base by keeping one of said motor bases at a fixed vertical position and controlling another one of said motor bases to activate said vertical movement for precisely controlling said vertical movement relative to said fixed vertical position.

2. A data storage system for accessing data stored in a data storage medium comprising:

a motor-head assembly controlled to activate a vertical movement for loading and unloading at least a pickup head supported thereon to access said data medium in said data storage medium; and said motor-head assembly further comprising a rotating means for rotating said pickup head when said pickup head is loaded onto said data storage medium.

3. The data storage system of claim 2 wherein:

said motor-head assembly further comprising a vertical-position locking means for automatically pulling away said pickup head from said data storage media when said motor-head assembly is unloaded from said data storage medium.

4. The data storage system of claim 3 wherein:

said vertical-position locking means further automatically unlocking said pickup head in an unconstrained compliance state next to said data storage medium when said motor-head assembly is loaded to said data storage medium.

5. The data storage system of claim 3 wherein:

said motor-head assembly further comprising a guide and stopping means for guiding said motor-head assembly in activating said vertical movement and stopping at a predetermined position for precisely controlling a relative position of said pickup head from said data storage medium.

6. The data storage system of claim 2 further comprising:

a linkage and locking means for locking said storage media in said data storage system and for linking and activating said vertical movement of said motor-head assembly to load said pickup head to said data storage medium.

7. The data storage system of claim 6 wherein:

said linkage and locking means further comprising a lever for moving said linkage and locking means for locking said storage media in said data storage system and for linking and activating said vertical movement of said motor-head assembly to load said pickup head to said data storage medium.

8. The data storage system of claim 6 wherein:

said linkage and locking means further comprising a unlocking mechanism for unlocking and removing said storage media from said data storage system and for linking and activating said vertical movement of said motor-head assembly to unload said pickup head from said data storage medium.

9. The data storage system of claim 6 wherein:

said motor-head assembly further comprising an inner motor base and an outer motor base wherein one of said motor bases is kept at a fixed vertical position and another one of said motor bases is controlled by said linkage and locking means to activate said vertical movement for precisely controlling said vertical movement relative to said fixed vertical position.

10. The data storage system of claim 2 further comprising:

a data-storage medium moving means for moving said data storage medium.

11. The data storage system of claim 10 wherein:

said data-storage medium moving means further includes a data-storage medium rotation means for rotating said data storage medium.

12. The data storage system of claim 10 wherein:

said data-storage medium moving means further includes a data-storage medium linear-moving means for moving said data storage medium along at least a linear direction.

13. A data storage system for accessing data stored in a data storage medium comprising:

a motor-head assembly controlled to activate a vertical movement for loading and unloading at least a pickup head supported thereon to access said data medium in said data storage medium; and said motor-head assembly further comprising an inner motor base and an outer motor base wherein one of said motor bases is kept at a fixed vertical position and another one of said motor bases is controlled to activate said vertical movement for precisely controlling said vertical movement relative to said fixed vertical position.

14. The data storage system of claim 13 wherein:

said outer motor base is kept at said fixed vertical position and said inner motor base is controlled by a cam-and-pin mechanism to move vertically relative to said outer motor base.

15. The data storage system of claim 13 wherein:

said outer motor base is kept at said fixed vertical position and said inner motor base is engaged to said outer motor base with a plurality of threads whereby a rotation of said outer motor base is implemented to move said inner motor base vertically relative to said outer motor base.

16. A method for configuring a data storage system for accessing data stored in a data storage medium comprising:

controlling a motor-head assembly to activate a vertical movement for loading and unloading at least a pickup head supported thereon to access said data medium in said data storage medium; and said step of controlling said motor-head assembly further comprising a step of employing a rotating means for rotating said pickup head when said pickup head is loaded onto said data storage medium.

17. The method of claim 16 wherein:

said step of controlling a motor-head assembly further comprising a step of employing a vertical-position locking means for automatically pulling away said pickup head from said data storage media when said motor-head assembly is unloaded from said data storage medium.

18. The method of claim 17 wherein:

said step of employing said vertical-position locking means further comprising a step of automatically unlocking said pickup head in an unconstrained compliance state next to said data storage medium when said motor-head assembly is loaded to said data storage medium.

19. The method of claim 17 wherein:

said step of controlling said motor-head assembly further comprising a step of employing a guide and stopping means for guiding said motor-head assembly in activating said vertical movement and stopping at a predetermined position for precisely controlling a relative position of said pickup head from said data storage medium.

20. The method of claim 16 further comprising:

employing a linkage and locking means for locking said storage media in said data storage system and for linking and activating said vertical movement of said motor-head assembly to load said pickup head to said data storage medium.

21. The method of claim 20 wherein:

said step of employing said linkage and locking means further comprising a step of employing a lever for moving said linkage and locking means for locking said storage media in said data storage system and for linking and activating said vertical movement of said motor-head assembly to load said pickup head to said data storage medium.

22. The method of claim 20 wherein:

said step of employing said linkage and locking means further comprising a step of employing a unlocking mechanism for unlocking and removing said storage media from said data storage system and for linking and activating said vertical movement of said motor-head assembly to unload said pickup head from said data storage medium.

23. The method of claim 20 wherein:

said step of controlling said motor-head assembly further comprising a step of employing an inner motor base and an outer motor base by keeping one of said motor bases at a fixed vertical position and controlling another one of said motor bases by said linkage and locking means to activate said vertical movement for precisely controlling said vertical movement relative to said fixed vertical position.

24. The method of claim 23 wherein:

said step of keeping one of said motor bases at a fixed position comprising a step of keeping said outer motor base at said fixed vertical position and controlling said inner motor base by a cam-and-pin mechanism to move vertically relative to said outer motor base.

25. The method of claim 23 wherein:

said step of keeping one of said motor bases at a fixed position comprising a step of keeping said outer motor base at said fixed vertical position and engaging said inner motor base to said outer motor base with a plurality of threads and rotating said outer motor base to move said inner motor base vertically relative to said outer motor base.

26. The method of claim 16 further comprising a step of:

employing a moving means for moving said data-storage medium.

27. The method of claim 26 wherein:

said step of employing said data-storage medium moving means further includes a step of employing a data-storage medium rotation means for rotating said data storage medium.

28. The method of claim 26 wherein:

said step of employing a data-storage medium moving means further includes step of employing a data-storage medium linear-moving means for moving said data storage medium along at least a linear direction.

* * * * *